Figure 1:
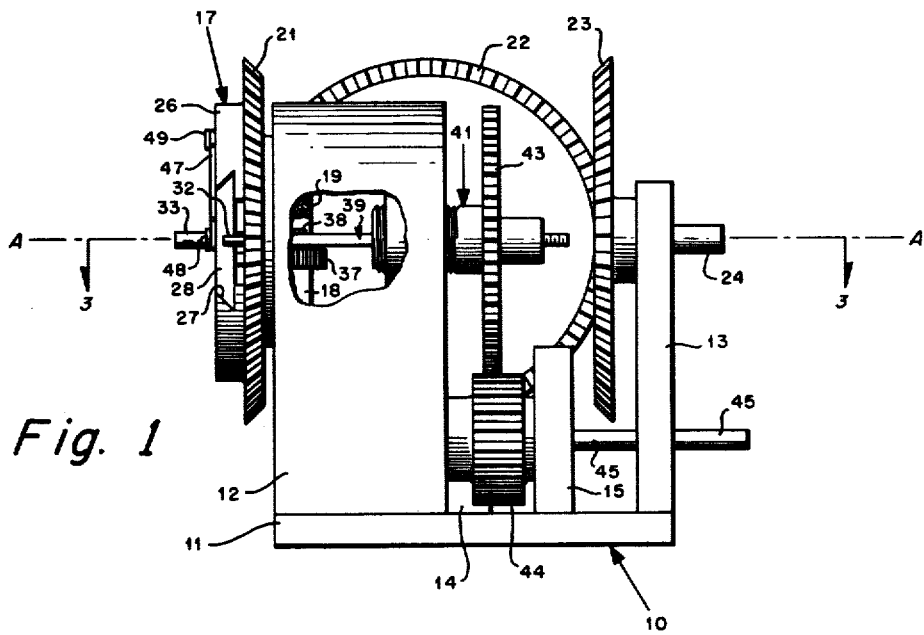

Aug. 20, 1963    Z. NARZAKIAN    3,101,008
COMPUTING APPARATUS

Filed Nov. 28, 1961    2 Sheets-Sheet 1

INVENTOR.
ZAVAN NARZAKIAN
BY
ATTORNEY

Aug. 20, 1963
Z. NARZAKIAN
3,101,008
COMPUTING APPARATUS
Filed Nov. 28, 1961
2 Sheets-Sheet 2
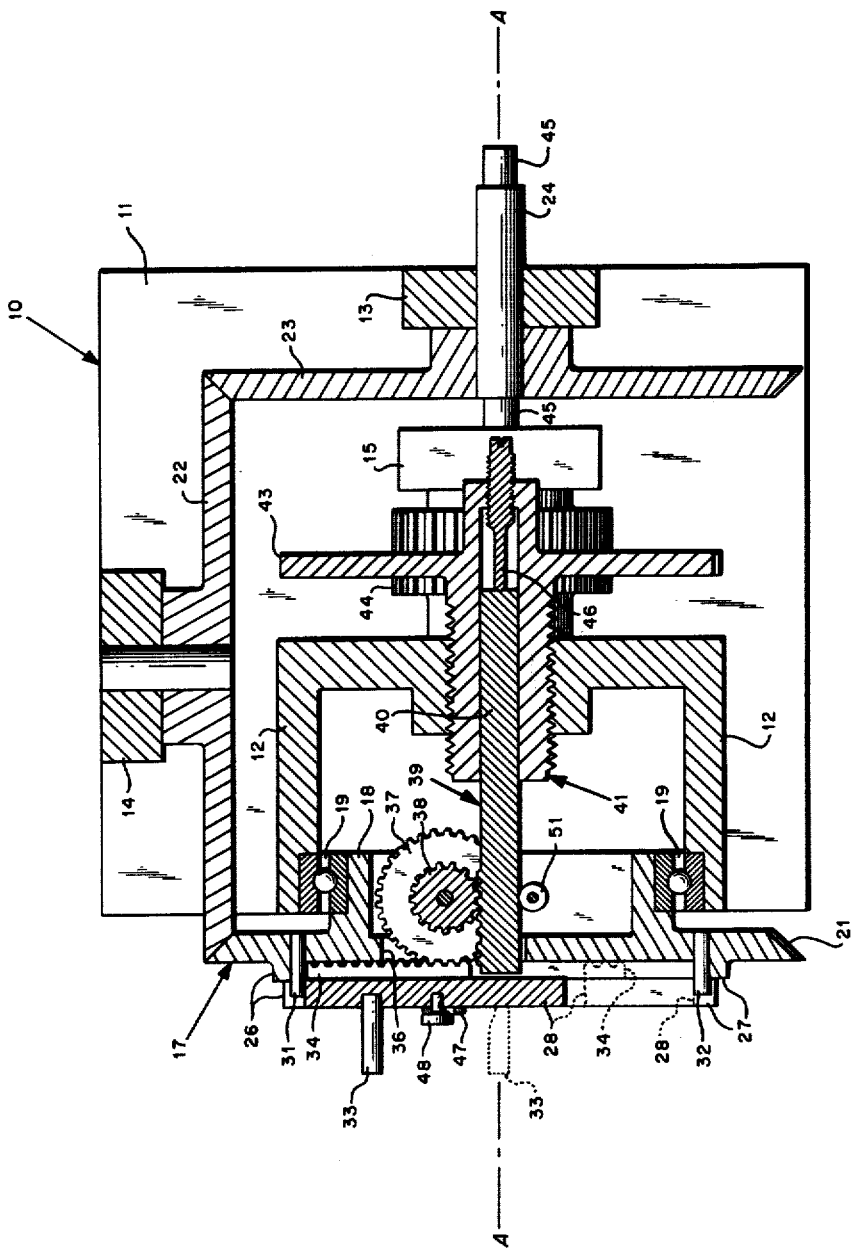
Fig. 3
INVENTOR.
ZAVAN NARZAKIAN
BY 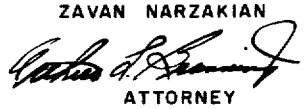
ATTORNEY

United States Patent Office 3,101,008
Patented Aug. 20, 1963

3,101,008
COMPUTING APPARATUS
Zavan Narzakian, Philadelphia, Pa., assignor to the United States of America as represented by the Secretary of the Navy
Filed Nov. 28, 1961, Ser. No. 155,510
3 Claims. (Cl. 74—600)
(Granted under Title 35, U.S. Code (1952), sec. 266)

The invention described herein may be manufactured and used by or for the Government of the United States of America for governmental purposes without the payment of any royalties thereon or therefor.

The present invention relates to a computing apparatus, and more particularly to a mechanical computing apparatus for continuously resolving a vector quantity into rectangular components thereof.

It is often desirable to resolve a vector quantity, which is defined by length and bearing, into rectangular components in order to present data in a form consistent with other data for subsequent computations. One such mechanical resolving device is disclosed in U.S. Patent 2,993,643 of P. G. Holt for Pilot's Automatic Dead Reckoning Equipment, wherein a computer receives an airspeed vector input vector signal in terms of airspeed and heading. These terms correspond to the length and angular position or bearing of the vector. The length of the airspeed vector is determined by the output shaft position of an airspeed responsive element, and the bearing by the output shaft position of a compass. The airspeed shaft position drives a member rectilinearly slidable along a radius of a wheel, and the compass shaft position rotates the wheel. The position of the member can then be measured along normal axes to provide rectilinear components of the vector. However, in order for the device to resolve the vector into pure rectilinear components they have heretofore required that the airspeed shaft position be compensated by the compass shaft position. In the absence of such compensation, a change in compass shaft position without any change in airspeed shaft position will nevertheless cause the slidable member to move along the wheel radius. The addition of a bearing correction, such as through a differential mechanism, thereby maintained the slidable member stationary relative to the wheel when only the compass shaft position is varied. Obviously, to incorporate this correction factor requires additional precision parts, which not only add to the weight and size of the resolving device, but further require compass shaft output to be of sufficient power to drive both the wheel and the slidable member due to their interconnection.

Accordingly, it is an object of the present invention to provide an improved mechanical computing apparatus for continuously resolving a vector defined by bearing and length components into rectangular components, in which the bearing and length components of the vector input signal are independent of each other, in which the power requirements of each input are determined solely for its respective condition responsive element, and in which the bearing and length components of the vector input signal may be varied relative to each other without affecting each other.

Another object of the invention is to provide an improved mechanical computer for continuously resolving a vector defined in polar components into rectangular components which is relatively simple in design and construction, accurate, reliable, and inexpensive to manufacture.

Various other objects and advantages will appear from the following description of one embodiment of the invention, and the most novel features will be particularly pointed out hereinafter in connection with the appended claims.

Figure 2:
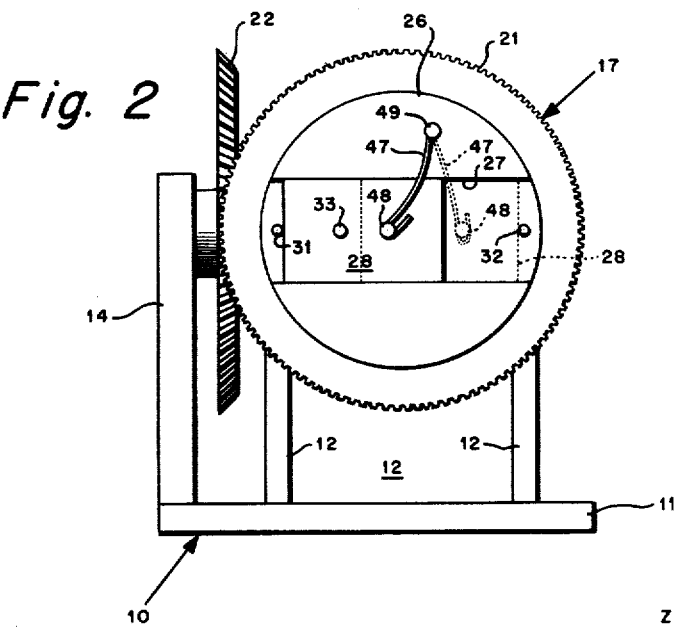

In the drawings:

FIG. 1 diagrammatically represents a partly cut-away view of a computing apparatus embodying the principles and concepts of the present invention;

FIG. 2 diagrammatically represents another view of the apparatus of FIG. 1 as viewed from the left end thereof; and FIG. 3 diagrammatically represents a cross-sectional view of the apparatus as taken along the line 3—3 of FIG. 1.

In the illustrated embodiment of the invention, primary structural support of the mechanical computing apparatus obtains from a rigid frame member, indicated generally by the numeral 10, including a base plate 11 and rigid extended portions 12, 13, 14, and 15. A resolver wheel, indicated generally by the numeral 17, having a bevel gear 21 cut about the periphery is rotatably supported on the extended portion 12 at a coaxial cylindrical boss portion 18 by a rolling bearing 19. The rotational axis, identified in the drawings by the chain line A—A, establishes one end of the vector from which its length is determined, and the vertex about which its bearing is determined. The wheel 17 is rotated about the axis A—A through the wheel bevel gear 21 by a train of bevel gears 22 and 23 axially connected to the extended portions 14 and 13, respectively, for relative rotation thereto, and an input shaft 24. The shaft 24, in turn, is adatped to be drivingly connected to the angular output of a device, such as a compass, which is indicative of the angular position or bearing of a vector quantity.

The resolver wheel 17 further defines an exposed cylindrical boss portion 26 coaxial with the wheel 17 having a slot 27 passing through the axis A—A. The transverse profile of the slot is of dovetail configuration for retaining a slidable block 28 at two opposed edges beveled to mate within the sides of the slot 27. The movement of the block 28 along the length of the slot 27 is limited by two studs 31 and 32 projecting from the boss portion 26 into the slot 27 at positions near the ends thereof. A shaft 33 projecting from the exposed side of the slidable block 28 is positioned on the block 28 so that when the block is against the stud 32, as shown in partial phantom outline, the shaft 33 is coaxial with the wheel 17 at the axis A—A; and when the block 28 abuts the stud 31, the shaft 33 is at its maximum radial displacement from the axis A—A.

It should now be apparent that the position of the shaft 33 about the axis A—A can provide indication of the bearing and length of a vector. It is a matter within the purview of one skilled in the art of computer techniques to measure the relative position of the shaft 33 from any two normal axes. When these axes have their origin or point of intersection on the axis A—A and in a plane perpendicular thereto, then distances measured in the same plane from them to the shaft 33 represent rectangular components of the vector.

The side opposite from the exposed side of the block 28 includes a gear rack 34 fixed on the block in an end-to-end position parallel to the slot 27. A portion of the length of the gear rack 34 is exposed by an aperture 36 for engaging a spur gear 37 which is axially connected to the wheel 17 for rotation relative thereto on an axis normal to and displaced from the axis A—A. The spur gear 37, driven by a pinion 38 coaxially fixed thereto for rotation therewith, meshes with a gear rack 39. The rack 39 includes a cylindrical shaft portion 40 coaxial with the wheel 17 along the axis A—A rotatably and slidably contained by a bushing assembly indicated generally by the numeral 41. The assembly 41, in turn, is rotatable about the axis A—A by a threaded connection to the extended portion 12 of the frame member 10. A coaxial gear portion 43, drivingly connected to a spur gear 44, will cause the member 41 to rotate and axially advance or retract along the threaded connection relative to the extended portion 12. An input shaft 45 coaxially fixed to the spur gear 44 for rotation therewith is journaled in the extended portions 13 and 15 of the frame member 10 and is adapted to be rotatably driven in response to a signal indicative of the length of the vector.

The rack 39, being slidable in the assembly 41, will follow the rotation of the wheel 17 due to meshing connection with pinion 38. Along the axis A—A, however, the rack 39 will follow the axial translation of the assembly 41. The rack 39 is urged against an adjustable pin 46 threadingly engaged to the assembly 41 along the axis A—A by means of cantilever spring 47 which is operatively connected between the slidable block 28 and the exposed boss portion 27 by a pair of studs 48 and 49, respectively. The adjustability of pin 46 provides for axially positioning the rack 39 relative to the assembly 41. The spring 47 urges the shaft 33 along the axis A—A against the pin 46 via the gear 37 and pinion 38. A positive meshing relationship of the pinion 38 and the rack 39 is ensured by a roller bearing 51 axially supported in the resolver wheel 17 adjacent to the side of the shaft 39 opposite of its rack teeth.

The operation of the computing apparatus should now be apparent. The shaft 24, when rotated to a position indicative of a vector bearing, causes the gears 22 and 23 to rotate the wheel 17 about the axis A—A until the slot 27 aligns in a corresponding position. The shaft 45, when angularly positioned an amount proportional to the vector length, causes the drive spur gear 44 to rotate the assembly 41 about the axis A—A and advance or retract in its threaded connection with the extended portion 12 a corresponding proportional amount. Of course, the gear 44 must be of sufficient width to maintain a meshing connection with the gear portion 43 for the entire axial translation of the assembly 41. Due to its positive contact on the pin 46 maintained by the spring 47, the rack 39 will axially follow the positioning of the assembly 41 along the axis A—A and likewise the block 28 will be proportionally positioned along the slot 27. The output shaft 33 on the block 28 will then be displaced from the axis A—A an amount proportional to the length of the vector, and its angular position about the axis A—A will correspond to the bearing or direction of the vector. By transducer means not shown, the position of the shaft 33 can be measured from any two normal axes having their origin at the axis A—A thereby obtaining rectangular components of the vector.

It will thus be seen that the inputs of vector bearing and length to the shafts 24 and 45 are maintained independent from each other and do not interact upon the positioning of the shaft 33. The power requirements of each of the inputs to the shafts 24 and 45 are determined solely by the forces needed in pure angular and rectilinear motions of the shaft 33 with respect to the axis A—A, hence they are at a minimum. It will be further observed that the present invention affords a compact arrangement of elements having a relatively few number of parts, and is capable of producing resolution of polar components into rectilinear components with great accuracy and reliability.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A computing apparatus for resolving a vector into rectangular components, comprising: a rigid support member, a resolver wheel axially connected to said support member for rotation relative thereto, output means operatively connected to said resolver wheel for sliding along a rectilinear slot radially disposed in said wheel, stop means fixed to said wheel for limiting the travel of said output means along said slot, bearing input means operatively connected to said resolver wheel for rotating said wheel in accordance with the vector direction, first rack means fixed to said output means and positioned along the length of said slot, first gear means axially connected to said wheel for rotation relative thereto and drivingly connected to said first rack means, second gear means coaxially connected to said first gear means and rotatable therewith, third gear means coaxial with said resolver wheel and having a hub threadingly connected to said support member, second rack means drivingly connected at one end to said second gear means and coaxially inserted at the other end thereof in one end of said hub for sliding and rotating relative thereto, adjusting means coaxially and threadingly inserted in the other end of said hub for limiting the insertion of said second rack means, magnitude input means drivingly connected to said third gear means for rotating said third gear means thereby axially moving said third gear means along the threaded connection thereof in accordance with the vector length, and force-exerting means operatively connected between said output means and said resolver wheel for slidably urging the insertion end of said second rack means against the insertion end of said adjusting means; whereby the distances of said output means from any two normal axes passing through the resolver wheel axis is proportional to the rectangular components of the vector input signals.

2. A computing apparatus for resolving a vector into rectangular components, comprising: a rigid support member, a resolver wheel axially connected to said support member for rotation relative thereto, output means operatively connected to said resolver wheel for sliding along a rectilinear slot radially disposed in said wheel, stop means fixed to said wheel for limitijng the travel of said output means along said slot, bearing input means operatively connected to said resolver wheel for rotating said wheel, first rack means fixed to said output means and positioned along the length of said slot, first gear means axially connected to said wheel for rotation relative thereto and drivingly connected to said first rack means, second gear means coaxially connected to said first gear means and rotatable therewith, third gear means coaxial with said resolver wheel and having a hub means threadingly connected to said support member, second rack means drivingly connected at one end to said second gear means and coaxially inserted at the other end thereof in one end of said hub means for sliding and rotating relative thereto, length input means drivingly connected to said third gear means for rotating said third gear means thereby axially moving said third gear means along the threaded connection thereof, and force-exerting means operatively connected between said output means and said resolver wheel for slidably urging the insertion end of said record rack means against said hub means; whereby the distances of said output means from any two normal axes passing through the resolver wheel axis is proportional to the rectangular components of the vector input signals.

3. A computing apparatus for resolving a vector into rectangular components, comprising: a rigid support member, a wheel axially connected to said support member for rotation relative thereto, output means operatively connected to said wheel for sliding along a rectilinear slot radially disposed in said wheel, bearing input means operatively connected to said wheel for rotating said wheel, first rack means fixed to said output means and positioned along the length of said slot, first gear means coaxial with said wheel and having a hub means threadingly connected to said support member, second gear means axially connected to said wheel for rotation relative thereto and drivingly connected to said first rack means, second rack means coaxially inserted at one end thereof in said hub means for sliding and rotating relative thereto and the other end drivingly connected to said second gear means, length input means operatively connected to said first gear means for rotating said first gear means thereby axially moving said first gear means along the threaded connection thereof, and force-exerting means operatively connected between said output means and said wheel for urging the insertion end of said second rack means against said hub means; whereby the distances of said output means from any two normal axes passing through the wheel axis is proportional to the rectangular components of the vector input signals.

References Cited in the file of this patent

UNITED STATES PATENTS

| | | |
|---|---|---|
| 2,428,372 | Knowles et al. | Oct. 7, 1947 |
| 2,551,359 | Bannow et al. | May 1, 1951 |
| 2,963,696 | Black et al. | Dec. 6, 1960 |

FOREIGN PATENTS

| | | |
|---|---|---|
| 280,070 | Germany | Nov. 5, 1914 |
| 361,657 | France | Sept. 3, 1907 |
| 809,921 | Great Britain | Mar. 4, 1959 |
| 1,066,233 | France | Jan. 20, 1954 |

UNITED STATES PATENT OFFICE
CERTIFICATE OF CORRECTION

Patent No. 3,101,008 August 20, 1963

Zavan Narzakian

It is hereby certified that error appears in the above numbered patent requiring correction and that the said Letters Patent should read as corrected below.

Column 4, line 39, for "limitijng" read -- limiting --; line line 59, for "record" read -- second --.

Signed and sealed this 21st day of April 1964.

(SEAL)
Attest:
ERNEST W. SWIDER

Attesting Officer

EDWARD J. BRENNER

Commissioner of Patents